(12) United States Patent
Mezger et al.

(10) Patent No.: US 7,755,540 B2
(45) Date of Patent: Jul. 13, 2010

(54) METHOD FOR OPERATION OF A RADAR SENSOR

(75) Inventors: Klaus Mezger, Rehetobel (CH); Leon Audergon, Winterthur (CH)

(73) Assignee: Bircher Reglomat AG, Speicher (CH)

( * ) Notice: Subject to any disclaimer, the term of this patent is extended or adjusted under 35 U.S.C. 154(b) by 0 days.

(21) Appl. No.: 12/464,341

(22) Filed: May 12, 2009

(65) Prior Publication Data

US 2009/0219188 A1 Sep. 3, 2009

Related U.S. Application Data

(62) Division of application No. 10/568,846, filed as application No. PCT/EP2004/008922 on Aug. 10, 2004, now abandoned.

(30) Foreign Application Priority Data

Aug. 19, 2003 (DE) ................. 103 38 536

(51) Int. Cl.
*G01S 7/40* (2006.01)
(52) U.S. Cl. .................................. 342/165
(58) Field of Classification Search ............... 342/165, 342/173, 174, 27, 74, 154, 127, 133, 146
See application file for complete search history.

(56) References Cited

U.S. PATENT DOCUMENTS

| 5,294,934 | A | 3/1994 | Matsumoto |
| 5,432,516 | A * | 7/1995 | Cherry et al. ................. 342/28 |
| 5,867,123 | A | 2/1999 | Geyh et al. |
| 6,220,627 | B1 | 4/2001 | Stanley |
| 6,366,237 | B1 | 4/2002 | Charles |
| 6,400,311 | B1 * | 6/2002 | Kolbli et al. ................ 342/128 |
| 2008/0198062 | A1 * | 8/2008 | Mezger et al. ................ 342/27 |
| 2009/0219188 | A1 * | 9/2009 | Mezger et al. ................ 342/27 |

FOREIGN PATENT DOCUMENTS

| DE | 4217426 A1 | 12/1993 |
| DE | 10012115 A1 | 9/2001 |
| EP | 1508818 A1 * | 2/2005 |
| EP | 1612578 A1 * | 1/2006 |
| WO | 03054333 A2 | 7/2003 |
| WO | WO 2005019859 A2 * | 3/2005 |

\* cited by examiner

*Primary Examiner*—Dan Pihulic
(74) *Attorney, Agent, or Firm*—Bachman & LaPointe, P.C.

(57) ABSTRACT

A method for close-proximity operation of a radar sensor for the generation of a usable detection field, for the recognition of people and/or stationary objects by an antenna, whereby the detection field can be altered or adjusted electronically.

5 Claims, 4 Drawing Sheets

METHOD FOR OPERATION OF A RADAR SENSOR

CROSS-REFERENCE TO RELATED APPLICATIONS

This application is the U.S. Divisional application of Ser. No. 10/568,846, filed Sep. 18, 2006, which is a U.S. National Stage of PCT/EP2004/008922, Filed Aug. 10, 2004, which claims priority of German Application No. 103 38 536.3, filed Aug. 19, 2003.

The invention relates to a method for operation of a radar sensor in the near area for production of a detectable coverage field for the identification of people and/or stationary objects by means of an antenna.

In the case of conventional radar sensors, which generally also have associated stationary sensors as well as infrared transmitters and sensors, the coverage field is too complex to determine and to adjust. When it is intended to change the coverage field, then the position of the radar sensor, for example in the wall, must be inclined or changed manually.

This change in the position of the radar sensor about its position, for example with respect to a wall or with respect to a specific object, is highly complex and inaccurate.

In particular for the determination of stationary obstructions by means of a distance and phase measurement, a coverage field cannot always be set very accurately, and this is undesirable.

Corresponding radar sensors are used, for example, on automatic doors and gates, which are used to open and close the doors and gate and at the same time prevent people being jammed in them or injured. The sensors can be constructed on the basis of passive infrared, active infrared, ultrasound and radar. Motion sensors and presence sensors are frequently also combined in one appliance. For example, a radar motion sensor is frequently used in conjunction with an active infrared presence sensor.

This has the disadvantage that the coverage field must be aligned and adjusted on the doors manually during installation. This means that the specialist has to climb up to the sensor, for example by means of a ladder, and must reset the inclination angle of the sensor, in order to influence the coverage field, by using a trial and error process to change the inclination, for example by means of a complex adjustment mechanism.

In this case, the sensor and evaluation electronics are frequently separated from one another in the housing, thus necessitating an additional separate holder and further connectors, etc.

A further disadvantage is that conventional radar sensors require a large installation volume and an undesirable installation depth, and simple manual setting or adjustment is impossible. In addition, infrared sensors may be provided, which can disadvantageously be influenced by stray light so that the sensors do not operate uniformly and continuously, particularly in the presence of sunlight. A further disadvantage is that conventional radar sensors with integrated infrared presence sensors cannot be used everywhere owing to the character of the ground or floor, and different ground or floor reflection levels. The reflection behavior in the case of conventional infrared presence sensors must be entered in the sensor and must be trimmed, and this is undesirable. The conventional system must itself be adjusted and regulated out over each type of ground or floor. Certain types of ground or floor do not provide adequate reflection, so that it is not possible to use conventional sensors or radar sensors. Air movements can undesirably influence the process, particularly in the case of ultrasound sensors.

Conventional passive infrared systems have the disadvantage that they respond only to heat differences, so that safety-relevant use is not ensured.

The present invention is based on the object of providing a method and a radar sensor for carrying out the method, which overcome the stated disadvantages and by means of which a coverage field can be set and changed easily in a simple and cost-effective manner. A further aim is that it should be continuously possible to check the serviceability of the radar sensor during operation. A further aim is to considerably reduce the manufacturing costs, installation costs and adjustment costs.

This object is achieved by the features of patent claim 1 and by the features of the other independent patent claims.

In the case of the present invention, it has been found to be particularly advantageous for a radar sensor to have a plurality of slot antennas, which are provided on a base surface, in order to change the coverage field electronically.

In this case, the dynamic radar sensor may additionally have an associated presence sensor, which is likewise provided with an electronically adjustable coverage field. In this case, the coverage field can be influenced by the number of corresponding slot antennas and by the arrangement of the corresponding slot antennas with respect to one another on the base surface. In this case, the coverage field can be adjusted for a specific type, for example by means of a remote control, which stores the values for one specific type and transmits them to the corresponding radar sensor. In this case, the slot antennas, the presence sensor and the evaluation electronics, possibly as well as an auxiliary antenna, are used in a form integrated in a base body, with the electronics being provided, for example, on a rear face of the base body.

In this case, it is also feasible to cover and compensate for widely different door types and installation situations by any desired combinations of presence and motion sensor modules using the same module systems.

The present invention also has the advantage that the size as well as the position of the coverage field that is produced, as well as the emission angle α, can be influenced by means of the selectable distance A and/or the distance B between two slot antennas which are arranged one above the other and/or two slot antennas which are arranged alongside one another. This makes it possible, in particular, to accurately detect moving objects in the dynamic field that is produced, as the coverage field.

It is also important that the size as well as the location of the dynamic field can be determined and aligned exactly.

Furthermore, a presence sensor may be associated with the radar sensor, in particular the dynamic radar sensor. However, it is also intended to be within the scope of the present invention for the presence sensor to be used autonomously and independently of the radar sensor, in order to identify static objects in a presence field.

In addition, the presence sensor can be aligned with a desired width and length and, in particular, by the use of one transmitter and one receiver, in particular by determining the angles of the phase-shifted received signals, to locate and determine the position and the size of the object. This is likewise intended to be within the scope of the present invention.

The presence sensor is preferably a radar sensor, in particular an FMCW radar sensor, with an integrated independent auxiliary antenna for carrying out self-tests. An identifiable output signal is produced at the receiving antenna by influencing the useful field energy. This makes it possible to check the entire signal path including the antennas within the sensor system.

The present invention has the advantage that suitable and selectable coverage fields can be produced in particular by the formation of different arrangements of slot antennas and can still be changed electronically, for example by means of a remote control. The slot antennas essentially form the motion sensor or dynamic sensor, with the presence sensor being used only for distance and phase measurement in order to identify a stationary obstruction. In this case, the position or size of the coverage field can also be adjusted electronically by means of a remote control, in which case these self-tests can be carried out by means of an integrated, independent auxiliary antenna.

These two sensor types, that is to say the presence sensor as well as the radar sensor, can be accommodated either individually or else in a combined form in a common radar sensor or combination sensor, and can be mounted on door frames, walls, in front of corresponding doors, gates or the like, without any corresponding mechanical adjustment mechanisms. In this case, any desired combinations of presence and motion sensors and/or radar sensors are possible. These are likewise intended to be within the scope of the present invention.

Further advantages, features and details of the present invention will become evident from the following description of preferred exemplary embodiments and from the drawing, in which:

FIG. 1b shows schematically illustrated side views of one possible usage position of the radar sensor shown in FIG. 1a;

Figure 2A:
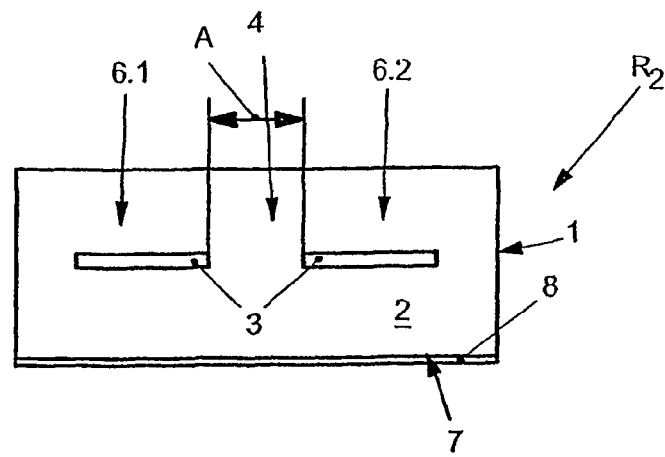
Figure 2B:
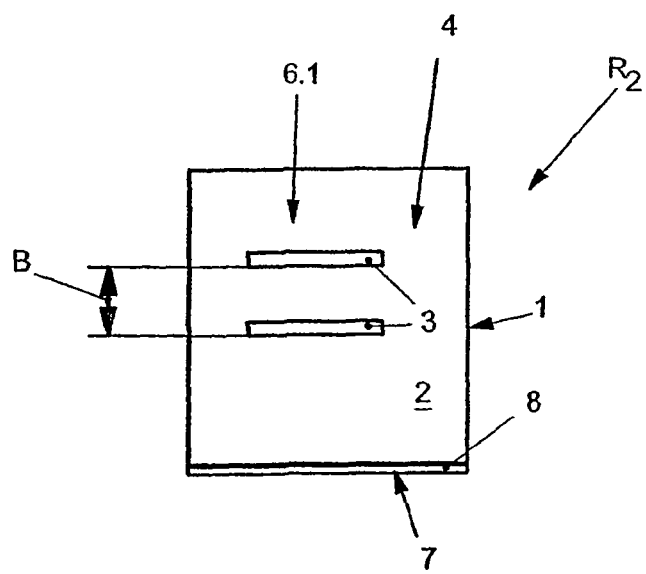
Figure 2C:
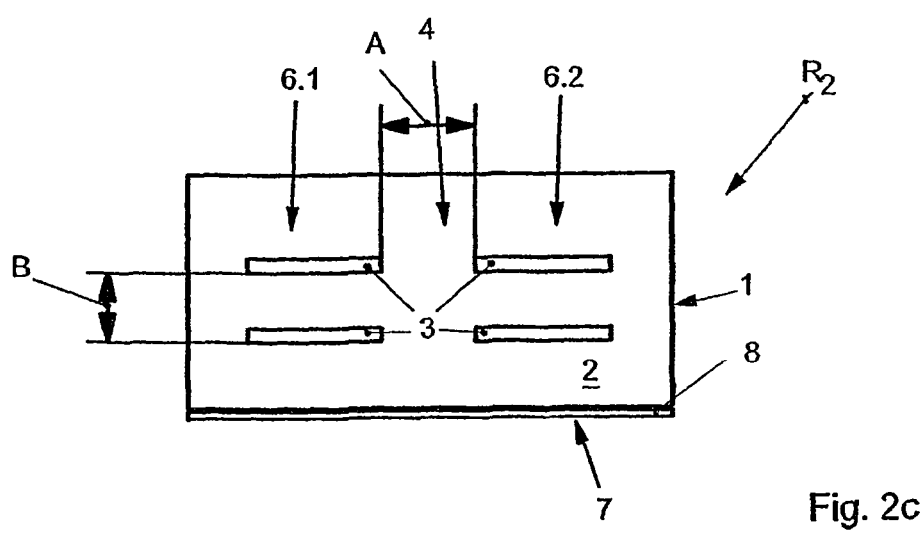
Figure 3:
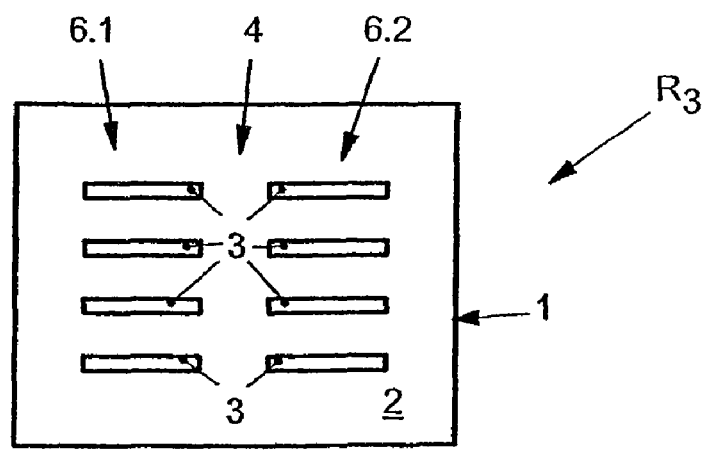
Figure 4:
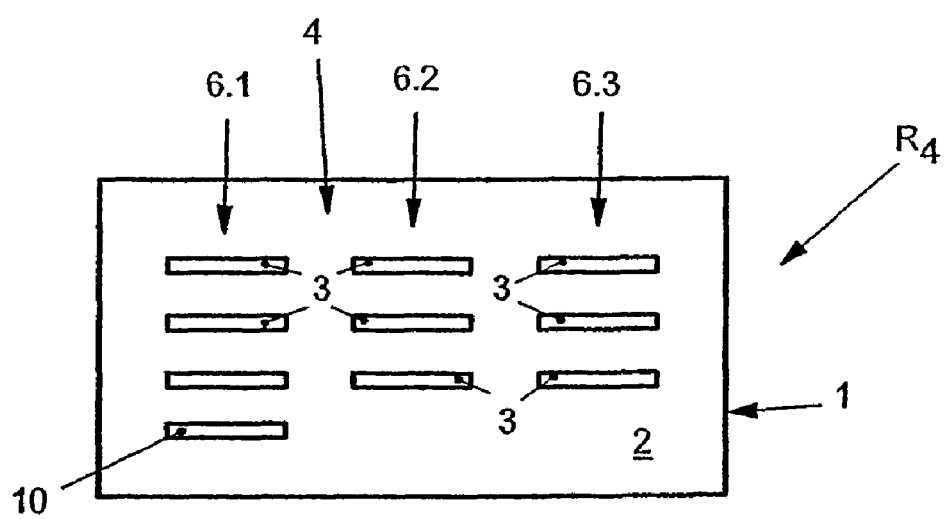
Figures 5A, 5B:
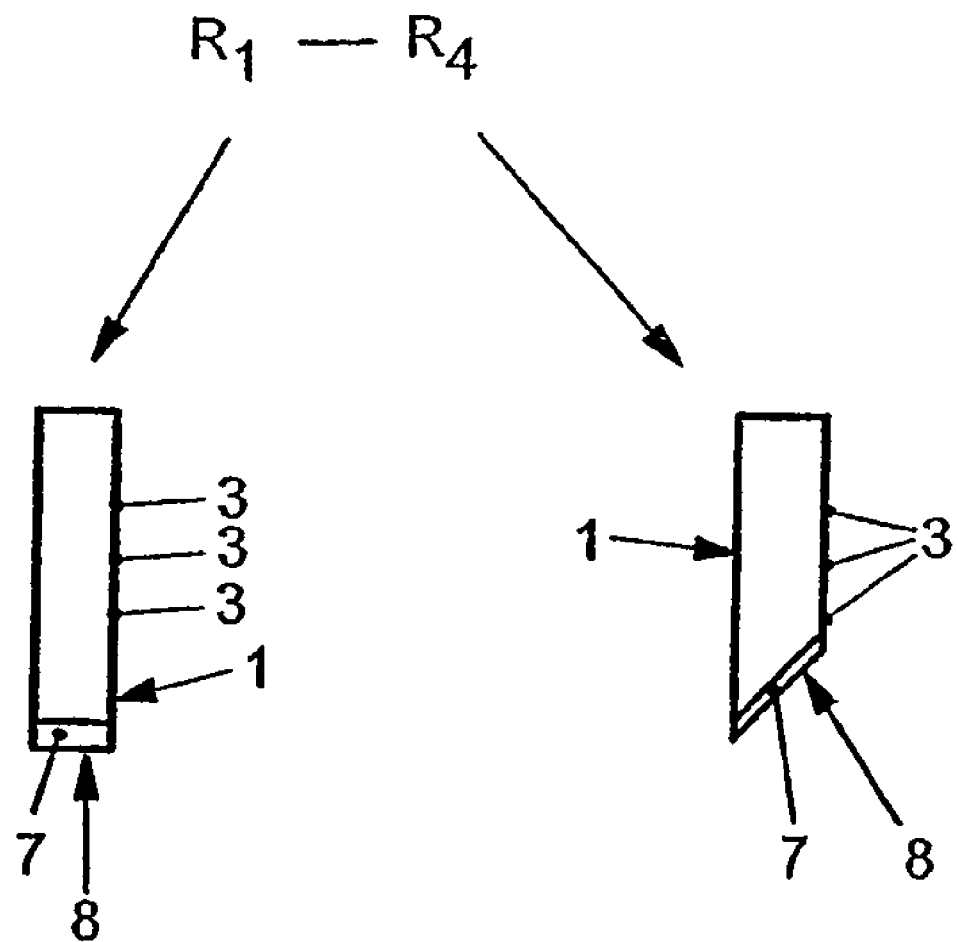

FIGS. 2a to 4 each show plan views of further exemplary embodiments of further radar seniors; and FIGS. 5a and 5b show further exemplary embodiments of the radar sensors as shown in FIGS. 2 to 4, in each case in the form of side views.

Figure 1A:
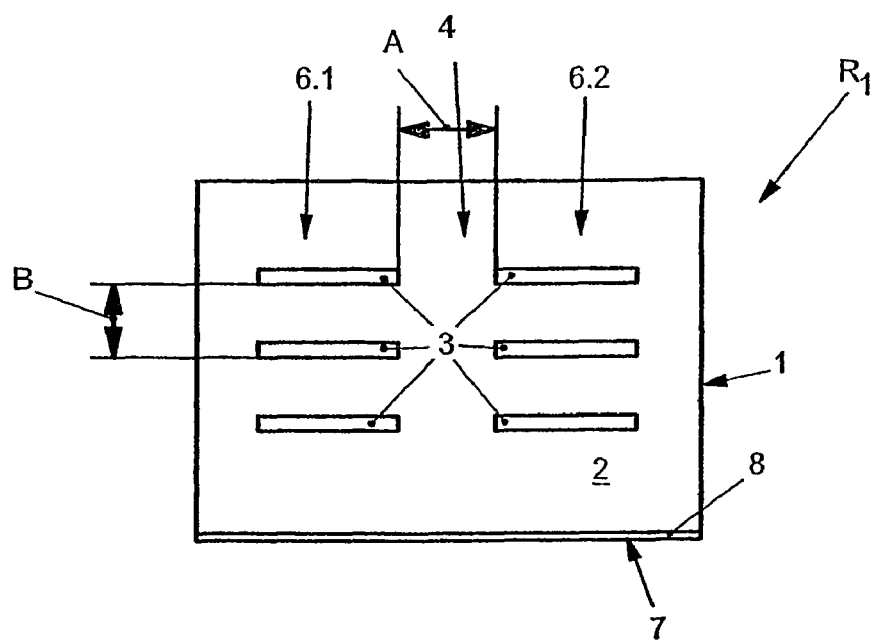
FIG. 1a shows a schematically illustrated plan view of a radar sensor according to the invention.

As can be seen from FIG. 1a, the radar sensor $R_1$ according to the invention comprises a base body 1 which has an outer base surface 2 that is preferably formed from metal. A plurality of antennas, in particular slot antennas 3, are provided in the base surface 2, and/or are formed from the base surface 2. The slot antennas 3 are preferably in the form of a dielectric from the base surface 2, or are cut out of it as a dielectric. Any desired antennas of widely different types and configurations may be used as antennas 3. However, it is preferable to use slot antennas 3.

Figure 1B:
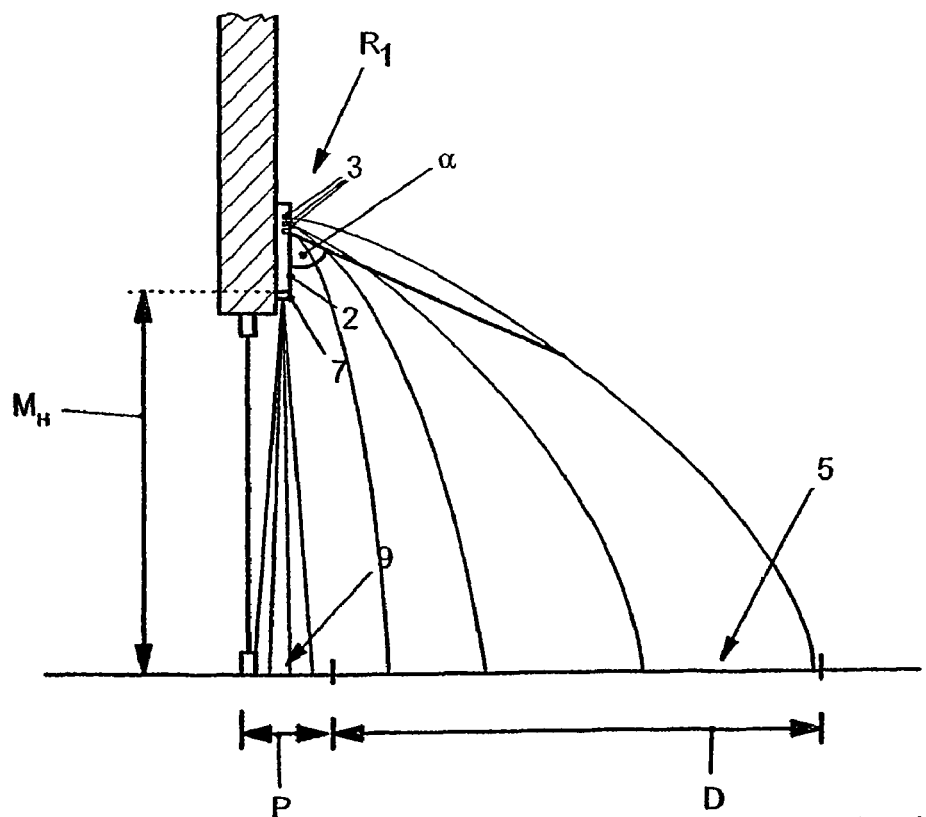

One important feature of the present invention is that an arrangement 4 formed from the individual slot antennas 3 is provided centrally in the base plate 2, so that this makes it possible to generate a specific wavefront which produces a desired coverage field 5 or dynamic field D at an emission angle α, see FIG. 1b. The emission angle α can be influenced to determine and localize the coverage field 5 only by means of the distances A and/or B, which may be selected or designed to be different, between the slot antennas 3, which are provided arranged one above the other and alongside one another in the base plate 2. In particular, variation of the distance A and/or B between the two slot antennas 3 allows the emission angle α to be influenced and the width and size of the coverage field 5 at a specific point to be determined. In this way, it is possible to produce a radar sensor $R_1$ as a function of a specific installation height $M_H$, and which can be produced specifically for any installation location. If required, the coverage field can also be finely adjusted by remote control by means of appropriate phase shifting.

It is also important that the emission angle α and the field size can be influenced and varied by electronic control of the energy levels emitted from the individual antenna elements, in particular slot antennas 3. Furthermore, electronic adjustment capabilities can be achieved by obtaining and evaluating the phase information, that is to say evaluation of the frequency and phase, allowing electronic scanning and electronic field limiting of the coverage field. It is thus also possible to influence changing installation heights $M_H$ in the radar sensor $R_1$.

In this case, a plurality of slot antennas 3 may be provided one above the other as well as a plurality of slot antennas 3 alongside one another, preferably at the same height in the base surface 2 of the radar sensor $R_1$.

A first arrangement 6.1 is preferably formed from 3 slot antennas which are arranged one above the other and parallel to one another, with a second arrangement of virtually identical slot antennas 3 being formed alongside this, and at a distance from it. In this case, the respective adjacent slot antennas 3 in the arrangements 6.1. 6.2 are at the same height.

This allows the first arrangement 6.1 and the second arrangement 6.2 of slot antennas 3 to produce appropriate wave fronts, which are superimposed, in order to produce a coverage field.

If other fields or angles are desired, then other arrangements 6.1, 6.2 of slot antennas 3 with respect to one another are feasible at different distances A and/or B.

FIGS. 2a to 2c show a sensor $R_2$ in which two or four slot antennas 3 are provided, with in each case two arrangements 6.1 being aligned one above the other and two arrangements 6.2 being aligned alongside one another in the base plate 2. Furthermore, it is likewise possible to influence the size and the emission angle α of the received field 5.

FIG. 3 shows a radar sensor $R_3$ in which two arrangements 6.1, 6.2 are provided alongside one another, and are each composed of four slot antennas 3 arranged one above the other.

FIG. 4 shows a radar sensor $R_4$ which is formed from three arrangements 6.1 to 6.3, which are arranged alongside one another and are each formed from three slot antennas 3 arranged one above the other.

However, the scope of the invention is also intended to cover, in particular, at least two arrangements 6.1, 6.2 being formed from at least two slot antennas 3 alongside one another, in which case a plurality of arrangements 6.1 to 6.3 can be formed alongside one another, with any desired number of slot antennas 3 in the base surface 2.

Another important feature of the present invention is that the size of the coverage field 5 can be influenced as a function of the emission angle α, as a function of a selectable and predetermined or determinable installation height $M_H$, as is indicated in particular in FIG. 1b.

Furthermore, in consequence, the emission angle α is likewise determined via the installation height $M_H$, which is generally predetermined, and over a selectable and determinable emission angle α based on the arrangement of the slot antennas 3 in the base surface 2 of the radar sensor $R_1$, in order to produce the coverage field 5 in a desired dynamic field D at a desired distance from the sensor $R_1$.

In this case, by way of example in the case of the present invention, the size of the coverage field 5 and the distance from the sensor to the coverage field 5 can be influenced in particular via the arrangement of the slot antenna 3 for a predetermined or selected installation height $M_H$.

Furthermore, at least one presence sensor 7, which is indicated in FIGS. 1a and 1b here and is provided in one side surface 8, can be associated with the radar sensor $R_1$ to $R_4$.

The presence sensor 7 can also be produced autonomously as a single component. The side surfaces 8 and base surface 2 are preferably formed at an angle to one another, in particular at right angles to one another, so that the presence sensor 7 can be used to detect an additional coverage field 9 or presence field P. This additional coverage field 9 is used, for example, to identify a stationary obstruction, for example in the movement area of a door or a gate.

Another important feature of the present invention is that fine setting or adjustment of the emission angle $\alpha$ is possible, for example for fine setting or fine adjustment, for example by means of a remote control by phase shifting the individual reflective received signals between the slot antennas 3. This allows the size of and the distance of the coverage field 5 to be influenced and varied very easily by means of a remote control, thus ensuring that installation involves extremely little effort.

In particular, the radar sensor $R_1$ can be configured very easily via a remote control.

By way of example, it is feasible for a first installed radar sensor to be configured, and for these parameters to be stored in the remote control in order to just transmit this data via the remote control to the subsequent, further radar sensors that need to be set. This is likewise intended to be within the scope of the present invention.

As is indicated by way of example in FIG. 4, it is also intended to be within the scope of the present invention to have the capability for each radar sensor $R_1$ to $R_4$ and/or presence sensors 7 to have at least one associated auxiliary antenna 10, which draws energy from the existing radar sensor. This allows the radar sensor $R_1$ to $R_4$ and/or the presence sensor 7 to be tested for serviceability by drawing energy. A test supply, which may be at the same frequencies as or at different frequencies from the antenna, in particular the slot antenna 3, can be produced in particular by loading the actual field of the radar sensor $R_1$ to $R_4$ as well as that of the presence sensor 7. The corresponding signals can generate the test signal permanently, so that the serviceability of the radar sensor and/or the presence sensor 7 can be checked all the time. The auxiliary antenna 10 may be designed to be autonomous, and can check the serviceability of the radar sensor $R_1$ to $R_4$ and/or that of the presence sensor 7 as well all the time.

LIST OF ITEM NUMBERS

1 Base body
2 Base surface
3 Slot antenna
4 Arrangement
5 Coverage field
6 Arrangement
7 Presence sensor
8 Side surface
9 Coverage field
10 Auxiliary antenna
$R_1$ Radar sensor
$R_2$ Radar sensor
$R_3$ Radar sensor
$R_4$ Radar sensor
$\alpha$ Emission angle
$M_H$ Installation height
A Distance
B Distance
D Dynamic field
P Presence field

The invention claimed is:

1. A method for operation of a radar sensor in a near area for production of a detectable coverage field for the identification of people and/or stationary objects by means of an antenna, wherein a presence sensor is equipped with an FMCW radar for distance measurement, and/or a radar sensor is equipped with an autonomous auxiliary antenna for carrying out a self test, wherein energy for a test supply is taken from the radar sensor and/or from the present sensor by means of the autonomous auxiliary antenna, and serviceability of the radar sensor and/or of the present sensor is checked, and wherein a signal which is evaluated and used to evaluate the serviceability of the radar sensor and/or of the present sensor is determined by drawing energy by means of the autonomous auxiliary antenna or by loading the actual coverage field of the radar sensor and/or of the present sensor at different frequencies or at the same frequencies.

2. The method as claimed in claim 1, wherein the direction, location and size or area of a coverage field is influenced via a phase shift, which is set by means of a remote control, or evaluation of the frequency and phase between the output signal and the input signal.

3. The method as claimed in claim 1, wherein an evaluation process is carried out by evaluation of a frequency and phase of the individual reflected antenna signals.

4. The method as claimed in claim 3, wherein an emission angle $\alpha$ of the coverage field is set or adjusted via the phase shift of the antenna signals, in which case the radar sensor is arranged at right angles on any desired base.

5. The method as claimed in claim 4, wherein the coverage field is set or aligned to cover an area or as a function of position, via the emission angle $\alpha$ as a function of an installation height ($M_H$), and/or the coverage field is aligned such that it is inclined downwards and, if required, is varied by fine adjustment.

* * * * *